United States Patent
Yun et al.

(10) Patent No.: US 8,511,857 B2
(45) Date of Patent: Aug. 20, 2013

(54) PLANAR LIGHT SOURCE AND BACKLIGHT UNIT HAVING THE SAME

(75) Inventors: Hyeong Won Yun, Gyunggi-do (KR); Joong El Ghim, Gyunggi-do (KR); Won Gi Lee, Gyunggi-do (KR); Chang Hoon Baek, Gyunggi-do (KR); Kil Yoan Chung, Gyunggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 146 days.

(21) Appl. No.: 12/331,612

(22) Filed: Dec. 10, 2008

(65) Prior Publication Data

US 2010/0039795 A1    Feb. 18, 2010

(30) Foreign Application Priority Data

Aug. 14, 2008    (KR) ............ 10-2008-0080177

(51) Int. Cl.
*F21V 21/00*    (2006.01)

(52) U.S. Cl.
USPC ...... 362/249.14; 362/603; 362/612; 362/613; 362/623

(58) Field of Classification Search
USPC .............. 362/249.14, 603, 612, 613, 623
See application file for complete search history.

(56) References Cited

U.S. PATENT DOCUMENTS

| | | | |
|---|---|---|---|
| 6,851,831 B2 | 2/2005 | Karlicek, Jr. | |
| 7,661,834 B2 | 2/2010 | Fenyo | |
| 7,824,073 B2* | 11/2010 | Hsieh et al. | 362/249.11 |
| 7,944,708 B2* | 5/2011 | Lin | 361/785 |
| 2005/0265051 A1* | 12/2005 | Yamamoto et al. | 362/657 |
| 2007/0291491 A1* | 12/2007 | Li et al. | 362/307 |
| 2008/0037284 A1* | 2/2008 | Rudisill | 362/629 |
| 2008/0123022 A1 | 5/2008 | Aoki et al. | |

FOREIGN PATENT DOCUMENTS

KR    10-2008-0027988 A    3/2008

OTHER PUBLICATIONS

United States Office Action issued in U.S. Appl. No. 13/587,481 dated Dec. 21, 2012.

* cited by examiner

*Primary Examiner* — Jong-Suk James Lee
*Assistant Examiner* — Mark Tsidulko
(74) *Attorney, Agent, or Firm* — McDermott Will & Emery LLP (57) ABSTRACT

A light source includes first to nth light emitting modules (n is a natural number that is two or more than two) each having a plurality of light emitting elements and connectors that are electrically connected to the light emitting elements. The connector of the first light emitting module is disposed near an angular point (hereinafter, referred to as "rotational central point") of a region defining the first light emitting module. The light emitting elements and connector of the $i_{th}$ light emitting module has a layout structure defined by a clockwise or counter-clockwise rotation of the light emitting elements and connectors of the first light emitting module by an angle $(i-1)/n \times 360°$ about the rotational central point, wherein i is a natural number which satisfies $2 \leq i \leq n$.

16 Claims, 9 Drawing Sheets

PRIOR ART

FIG. 1

PRIOR ART

PLANAR LIGHT SOURCE AND BACKLIGHT UNIT HAVING THE SAME

CROSS-REFERENCE TO RELATED APPLICATIONS

This application claims the priority of Korean Patent Application No. 2008-0080177 filed on Aug. 14, 2008 in the Korean Intellectual Property Office, the disclosure of which is incorporated herein by reference.

BACKGROUND OF THE INVENTION

1. Field of the Invention

The present invention relates to a planar light source and a backlight unit having the same, and more particularly, to a planar light source in which a layout structure of light emitting modules are optimized.

2. Description of the Related Art

In general, a cold cathode fluorescent lamp (CCFL) used as a light source of a backlight unit for a liquid crystal display (LCD) uses mercury gas. The mercury gas may cause the environmental contamination. In addition, the CCFL has slow response time and low color reproducibility. The CCFL is not appropriate for reducing the weight, thickness, length, and size of an LCD panel. Unlike the CCFL, a light emitting diode (LED) is environmentally friendly. In addition, the LED has a fast response time of about several nano seconds, thereby being effective for a video signal stream and enabling impulsive driving. Further, the LED has a color reproducibility of 100% or more and properly alters luminance, a color temperature, and the like by adjusting an amount of light emitted from red, green, and blue LEDs. Furthermore, the LED has advantages of reducing the weight, thickness, length, and size of the LCD panel. Therefore, in recent years, the LED has been widely used as the light source of the backlight unit for the LCD panel.

The backlight units employing the LEDs are classified in accordance with a location of the light source into edge-type backlight units and direct-type backlight units. The edge-type backlight unit is deigned such that a bar-type light source is located at a side to emit the light to an entire surface of the LCD panel using a light guide plate. The direct-type backlight unit is designed such that a planar light source having a substantially same surface area as the LCD panel is located under the LCD panel to directly emit the light to the entire surface of the LCD panel.

Figure 1:
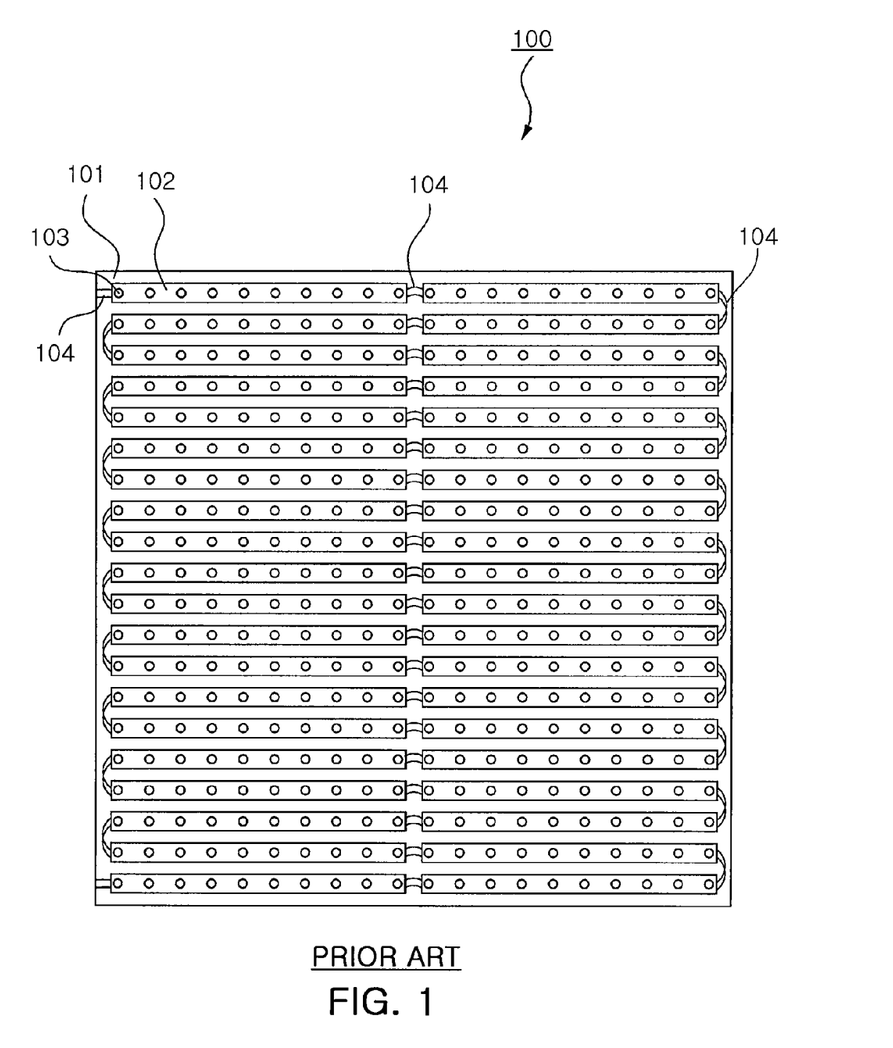
FIGS. 1 and 2 are top plane views of light emitting modules of light emitting sources according to related arts.
Figure 2:
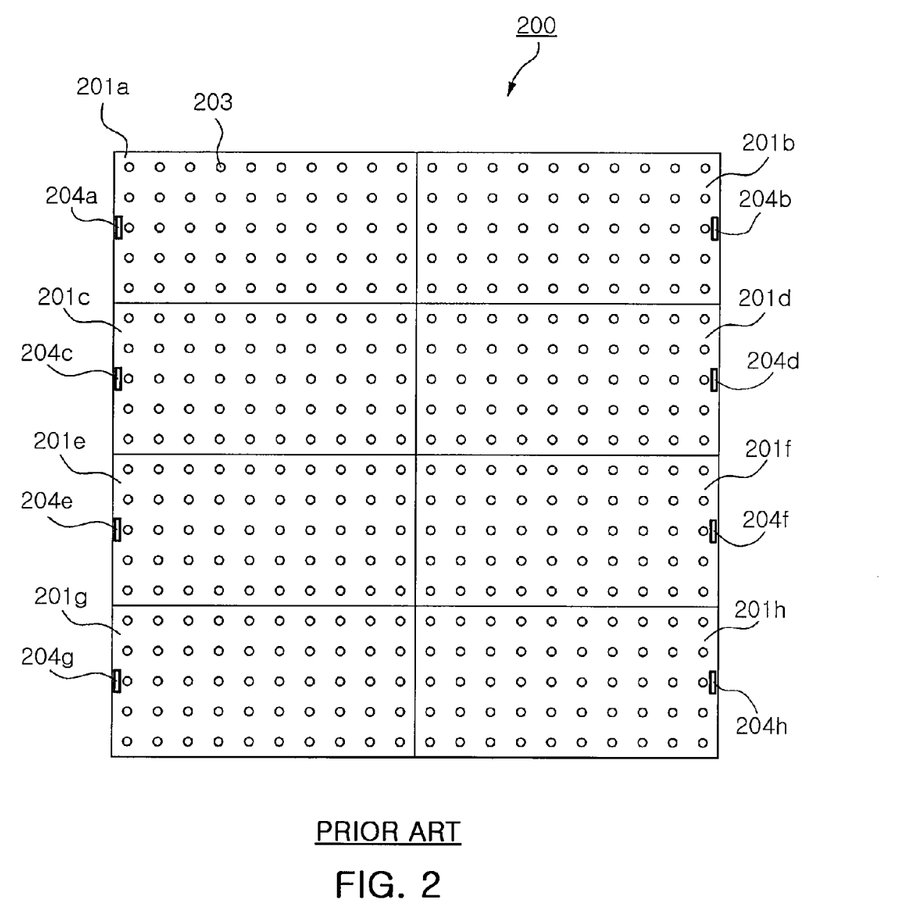

FIGS. 1 and 2 are top plane views illustrating a layout structure of light emitting modules of a planar light source according to a related art. As shown in FIG. 1, a planar light source 100 used for an LCD panel of the related art LCD panel includes a substrate 101 and a plurality of LEDs 103 that are arrayed on the substrate 101 in rows and columns. In this case, a plurality of bar-type light emitting modules each having the plurality of the LEDs 103 are properly interconnected and arrayed at left and right sides in the vertical direction. This light emitting module layout structure has limitations that connectors 104 for electrically interconnecting light emitting modules 102 must be disposed on left and right ends of each of the light emitting modules 102 and a large number of the light emitting modules 102 are required to reduce a thickness of a device and improve luminance uniformity.

In order to attenuate the limitations, a layout structure illustrated in FIG. 2 may be utilized. Referring to FIG. 2, a planar light source 200 of a related art includes a plurality of light emitting modules 201*a*, 201*b*, 201*c*, 201*d*, 201*e*, 202*f*, 201*g*, and 201*h*. Each of the light emitting modules 201*a*, 201*b*, 201*c*, 201*d*, 201*e*, 202*f*, 201*g*, and 201*h* includes a plurality of LEDs 203 that are two-dimensionally arranged in rows and columns and a connector 204*a* (204*b*, 204*c*, 204*d*, 204*e*, 204*f*, 204*g*, 204*h*). The numbers of the light emitting modules and connectors in the layout structure of FIG. 2 may less than the numbers of the light emitting modules and connectors in the layout structure of FIG. 1. However, when only one kind of the LED modules 201*a* is used to improve the efficiency, as shown in FIG. 2, the connectors 204*a*, 204*b*, 204*c*, 204*d*, 204*e*, 204*f*, 204*g*, and 204*h* are linearly arrayed at left and right sides or inner sides and thus the electric wiring structure is not efficient.

Therefore, there is a need for a scheme that can optimize a layout structure of the light emitting modules of the planar light source.

SUMMARY OF THE INVENTION

An aspect of the present invention provides a planar light source in which not only a layout structure of light emitting modules but also a layout structure of light emitting elements and connectors in each of the light emitting modules are optimized.

Another aspect of the present invention provides a backlight unit that is designed to employ the planar light source to improve light emitting efficiency by adjusting a layout location of optical sheet.

According to an aspect of the present invention, there is provided a light source including: first to nth light emitting modules (n is a natural number that is two or more than two) each having a plurality of light emitting elements and connectors that are electrically connected to the light emitting elements, wherein the connector of the first light emitting module is disposed near an angular point (hereinafter, referred to as "rotational central point") of a region defining the first light emitting module; and the light emitting elements and connector of the $i_{th}$ light emitting module has a layout structure defined by a clockwise or counter-clockwise rotation of the light emitting elements and connectors of the first light emitting module by an angle $(i-1)/n \times 360°$ about the rotational central point, wherein i is a natural number which satisfies $2 \leq i \leq n$.

The first to nth light emitting modules may be formed in an identical shape.

The light emitting elements and connector of the first light emitting module has a layout structure defined by a clockwise or counter-clockwise rotation of the light emitting elements and connector of the $n_{th}$ light emitting module by an angle of $1/n \times 360°$.

The n may be a natural number that is three or more than three, and a shape defined by the first to nth light emitting modules is a perfect polygonal shape having n angles. For example, the shape defined by the first to nth light emitting modules may be a perfect square shape.

The shape defined by each the first to nth light emitting modules is an arch shape and a shape defined by all of the first to nth light emitting modules is a circular shape.

According to another aspect of the present invention, the plurality of the light emitting elements of the first light emitting module are two-dimensionally arranged in first and second directions that are different from each other.

In this case, at least some of the plurality of the light emitting elements that are two-dimensionally arranged may have different pitches in the first and second directions and an angle defined between the first and second directions may be $1/n \times 360°$.

Furthermore, the first direction may be in parallel with a boundary line between the first and second light emitting modules and the second direction may be in parallel with a boundary line between the first light emitting module and the nth light emitting module.

According to still another aspect of the present invention, there is provided a backlight unit comprises a substrate; a planar light source comprising first to nth light emitting modules (n is a natural number that is two or more than two) that are disposed on an identical surfaces and each of which has a plurality of light emitting elements and connectors that are electrically connected to the light emitting elements, wherein the connector of the first light emitting module is disposed near an angular point (hereinafter, referred to as "rotational central point") of a region defining the first light emitting module and the light emitting elements and connectors of the second to nth light emitting modules having layout structure that are defined by rotating the light emitting elements and connector of the first light emitting module about the rotational central point clockwise or counterclockwise by $1/n \times 360°$; and a diffusing sheet assembly disposed above the planer light source and uniformly diffusing the light from the planar light source.

A distance from a top surface of the light emitting elements of the planar light source to the diffusing sheet assembly may be greater than a distance between the adjacent light emitting elements.

The backlight unit may further include a reflective layer that is disposed on the substrate to reflect light emitted from the light emitting elements.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of elements are exaggerated for clarity of illustration. Like reference numerals refer to like elements throughout.

Figure 3:
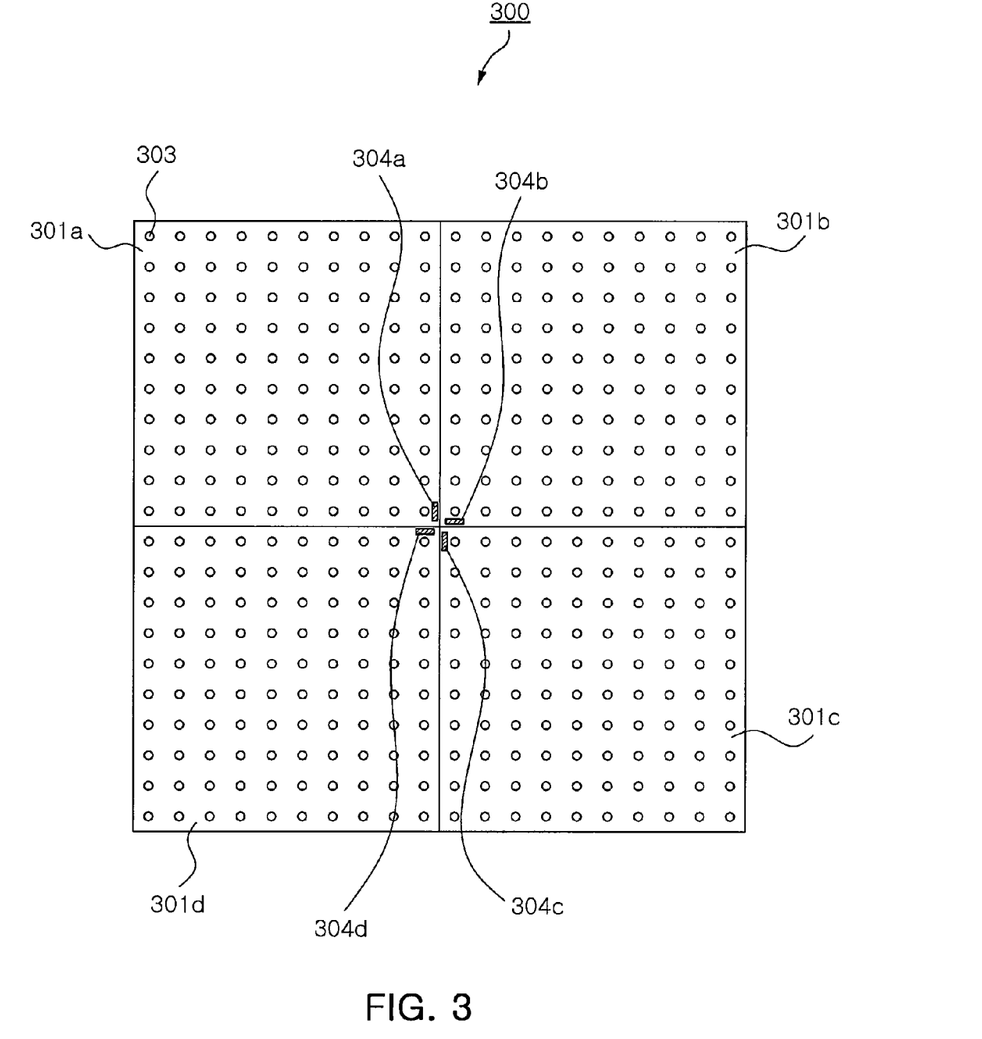
FIG. 3 is a schematic top plane view illustrating a layout structure of light emitting modules according to an embodiment of the present invention.
Figure 4A:
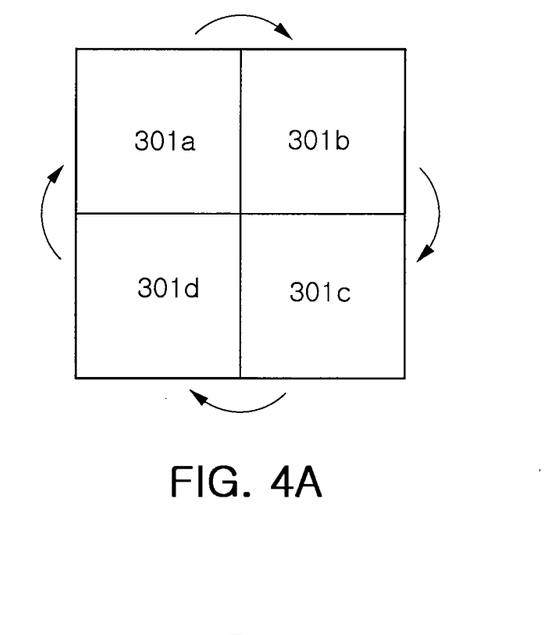
FIGS. 4A and 4B are rotational layout structures of the light emitting modules of FIG. 3.
Figure 4B:
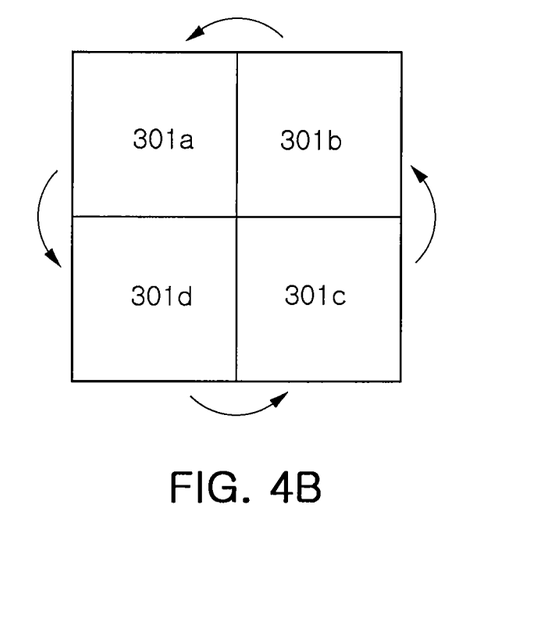

FIG. 3 is a schematic top plane view illustrating a layout structure of light emitting modules according to an embodiment of the present invention, and FIGS. 4A and 4B rotational layout structures of the light emitting modules of FIG. 3.

Referring first to FIG. 3, a planar light source 300 according to an embodiment includes first, second, third, and fourth light emitting modules 301a, 301b, 301c, and 301d. Each of the first, second, third, and fourth light emitting modules 301a, 301b, 301c, and 301d includes a plurality of light emitting elements 303 and a connector 304a (304b, 304c, 304d). The plurality of the light emitting elements 303 are two-dimensionally arrayed in rows and columns to define a light emitting region. Particularly, when light emitting diodes (LEDs) emitting white light are used as the light emitting elements 303, the planar light source 300 may be used for a backlight unit or a lighting device. The first, second, third, and fourth light emitting modules 301a, 301b, 301c, and 301d are formed in same structures such as a square structure. Each of the first, second, third, and fourth light emitting modules 301a, 301b, 301c, and 301d is structured such that the plurality of the light emitting elements 303 and the connector 304a (304b, 304c, and 304d) are arrayed on a substrate.

The connector 304a of the first light emitting module 301a is disposed near an angular point of the first light emitting module 301a. In this case, the angular point corresponds to a central point of the planar light source, i.e., a regular square defined by the first, second, third, and fourth light emitting modules in FIG. 3. In addition, it can be understood that the word "near" means that the connector 304a is disposed closest to a specific angular point among four angular points of the first light emitting module 301a. The specific angular point is a rotational central point of the light emitting module. This will be described later.

The second, third, and fourth light emitting modules 301b, 301c, and 301d have layout structures that are respectively defined by sequentially rotating the first light emitting module 301a about the rotational central point by 90°. That is, the plurality of the light emitting elements 303 and the connector 304b of the second light emitting module 301b have a layout structure that is defined by rotating the plurality of the light emitting elements 303 and the connector 304a of the first light emitting module 301a about the rotational central point by 90° clockwise. Likewise, the plurality of the light emitting elements 303 and the connector 304c of the third light emitting module 301c have a layout structure that is defined by rotating the plurality of the light emitting elements 303 and the connector 304b of the second light emitting module 301b about the rotational central point by 90° clockwise. In addition, the plurality of the light emitting elements 303 and the connector 304d of the fourth light emitting module 301d have a layout structure that is defined by rotating the plurality of the light emitting elements 303 and the connector 304c of the third light emitting module 301c about the rotational central point by 90° clockwise. This rotational layout structure is shown in FIG. 4A. Alternatively, the rotational direction may be a counterclockwise direction rather than the clockwise direction. In this case, the rotational layout structure is shown in FIG. 4B.

As shown in FIG. 3, the connectors 304a, 304b, 304c, and 304d of the respective first, second, third, and fourth light emitting modules 301a, 301b, 301c, and 301d are disposed near the rotational central point and thus distances between them is very short. Accordingly, the wiring structure for the power connection can be simplified. Further, as the first, second, third, and fourth light emitting modules 301a, 301b, 301c, and 301d has the sequential 90° rotational layout structures, the planar light source 300 of the embodiment can be realized with one kind of the light emitting modules. If the rotational layout structure is not used, the first, second, third, and fourth light emitting modules 301a, 301b, 301c, and 301d must have different structures in order to array the connectors 304a, 304b, 304c, and 304d close the rotational central point. That is, unlike this embodiment, four different light emitting modules are required. As described above, in the embodiment, the distances between the connectors 304a, 304b, 304c, and 304d are shortened and thus the electric wiring structure can be simplified and only one kind of the light emitting modules are required. Therefore, the standardization and productivity of the light emitting modules can be improved and thus the costs can be reduced.

Figure 5:
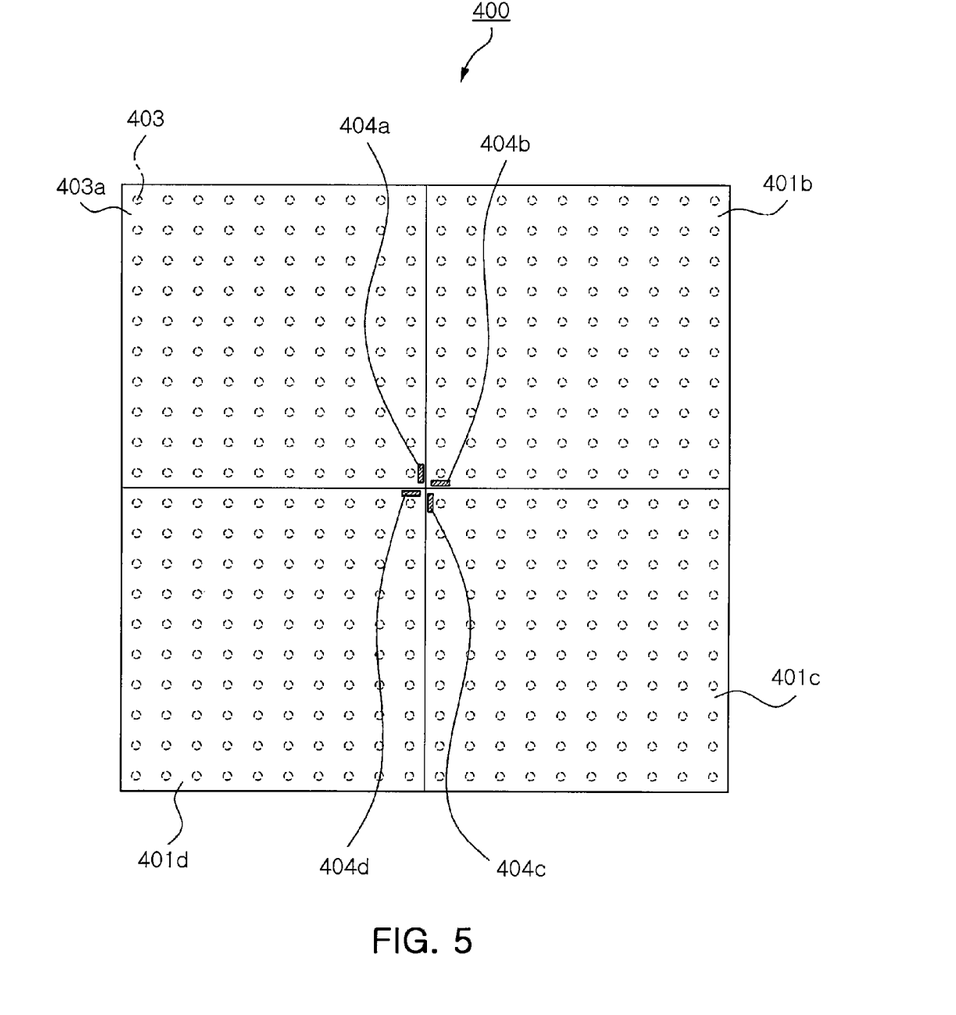
FIG. 5 is a schematic top plane view of a layout structure of light emitting modules of a planar light source according to another embodiment.

FIG. 5 is a schematic top plane view of a layout structure of light emitting modules of a planar light source according to another embodiment.

Referring to FIG. 5, a planer light source 400 of this embodiment includes first, second, third, and fourth light emitting modules 401a, 401b, 401c, and 401d. Each of the first, second, third, and fourth light emitting modules 401a, 401b, 401c, and 401d includes a plurality of light emitting elements 403 and a connector 404a (404b, 404c, 404d). Unlike the embodiment of FIG. 3, this embodiment is designed such that the connectors 404a, 404b, 404c, and 404d are arrayed at separate regions from the light emitting elements 403. That is, FIG. 5 is a view of the planar light source 400 taken from a location where the connectors 404a, 404b, 404c, and 404d are disposed. That is, in the first, second, third, and fourth light emitting modules 401a, 401b, 401c, and 401d, the connectors 404a, 404b, 404c, and 404d may be formed on an opposite surface to a surface where the light emitting elements 403 are formed. Accordingly, the light emitting elements 403 can be disposed without being limited by the connectors 404a, 404b, 404c, and 404d.

Figure 6:
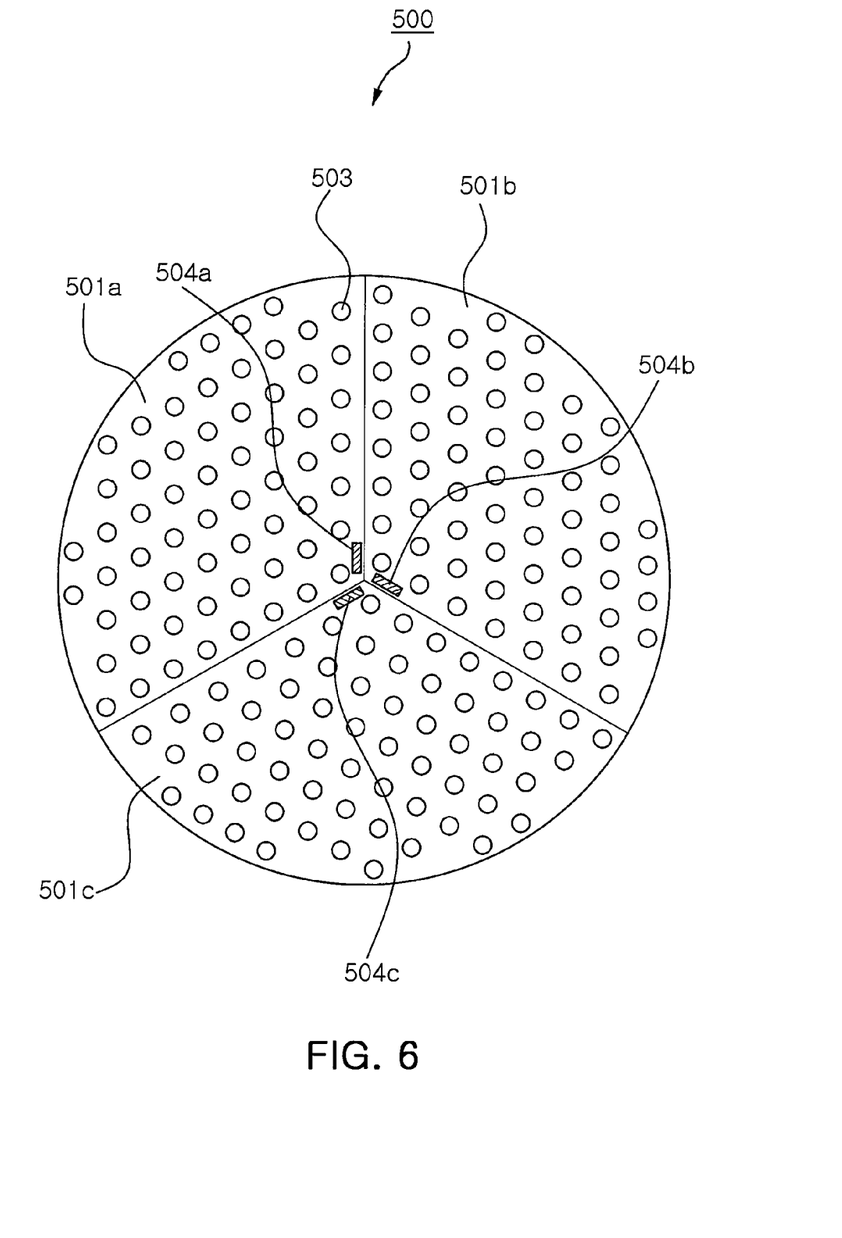
FIG. 6 is a schematic top plane view of a layout structure of light emitting modules of a planar light source according to another embodiment.

FIG. 6 is a schematic top plane view of a layout structure of light emitting modules of a planar light source according to another embodiment.

Referring to FIG. 6, a planer light source 500 of this embodiment includes first, second, and third light emitting modules 501a, 501b, and 501c. An outer line defined by the first, second, and third light emitting modules 501a, 501b, and 501c is circular. That is, the light emitting region is formed in a circular shape. Like the embodiment of FIG. 3, the first, second, and third light emitting modules 501a, 501b, and 501c are formed with a same shape and share an angular point (a rotational central point) with each other. That is, each of the first, second, and third light emitting modules 501a, 501b, and 501c is formed in an arc shape having an angular point angle of 120° (i.e., 360°/3). A plurality of light emitting elements 503 of the first light emitting module 501a are two-dimensionally arranged in first and second directions. An angle between the first and second directions is 120°. In this case, the first direction is in parallel with a boundary line between the first and second light emitting modules 501a and 501b and the second direction is in parallel with a boundary line between the first and third light emitting modules 501a and 501c.

The plurality of the light emitting elements 503 and connector 504b of the second light emitting module 501b have a layout structure that is defined by rotating the plurality of the light emitting elements 503 and connector 504a of the first light emitting module 301a by 120° about the rotational central point clockwise. Likewise, the plurality of the light emitting elements 503 and connector 504c of the third light emitting module 501c have a layout structure that is defined by rotating the plurality of the light emitting elements 503 and connector 504b of the second light emitting module 501b about the rotational central point by 120° clockwise. In this embodiment, although the circular planar light source 500 is equally divided into three sections, the present invention is not limited to this configuration. For example, the shape of the planar light source may be formed in a perfect polygonal shape having n angles (n is a natural number more than 3) such as a perfect triangular shape, a perfect square shape, a perfect pentagonal shape, and the like. In this case, the n-number light emitting modules may be arrayed at a rotation angle of 1/n×360°.

Figure 7:
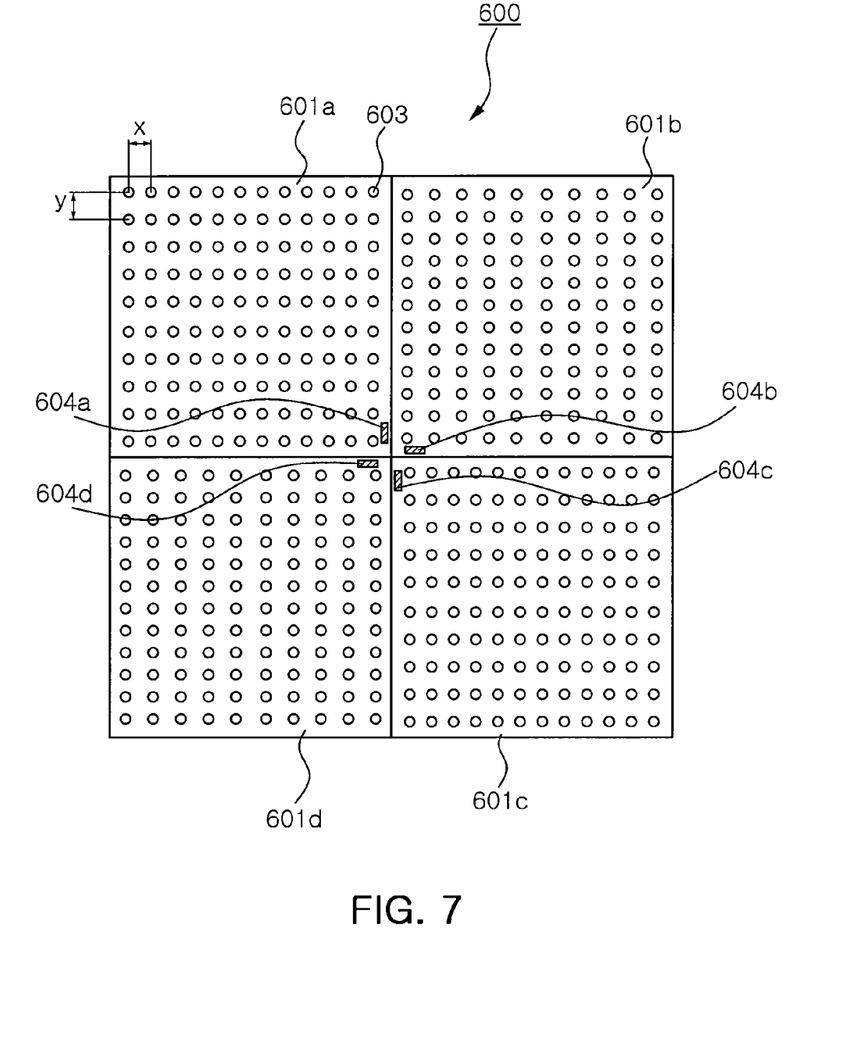
FIG. 7 is a schematic top plane view of a layout structure of light emitting modules of a planar light source according to another embodiment.

FIG. 7 is a schematic top plane view of a layout structure of light emitting modules of a planar light source according to another embodiment.

Referring to FIG. 7, a planar light source 600 according to this embodiment is similar to the planar light source 300 of FIG. 3, including first, second, third, and fourth light emitting modules 601a, 601b, 601c, and 601d. Each of the first, second, third, and fourth light emitting modules 601a, 601b, 601c, and 601d includes a plurality of light emitting elements 603 and a connector 604a (604b, 604c, 604d). The second, third, and fourth light emitting modules 601b, 601c, and 601d have layout structures that are respectively defined by sequentially rotating the first light emitting module 601a about the rotational central point by 90°.

In this embodiment, the plurality of the light emitting elements 603 of the first light emitting module 601a are arranged in rows and columns (i.e., in x and y-directions). The light emitting elements 603 in the x-direction have a different pitch from the light emitting elements 603 in the y-direction. In this embodiment, the pitch y in the y-direction is greater than the typical pitch x in the x-direction. Accordingly, the number of the light emitting elements 603 can be reduced. In more detail, the pitch x in the x-direction is about 26-27 mm, and the pitch y in the y-direction is about 29-37 mm. Although the pitch y in the y-direction is designed to be greater than the pitch x in the x-direction in this embodiment, the pitch x in the x-direction may be greater than the pitch y in the y-direction. That is, a feature of this embodiment is that the pitch x in the x-direction is different from the pitch y in the y-direction. Meanwhile, in the disclosure, the pitch is defined by a distance between centers of the adjacent light emitting elements 603.

According to this embodiment, since the pitch y in the y-direction is greater than the pitch x in the x-direction, the non-uniformity of the luminance can be minimized. Although the pitch y in the y-direction is greater than the pitch x in the x-direction in the first light emitting module, the pitch y in the y-direction may be less than the pitch x in the x-direction in the second light emitting module 601b and the third light emitting module 601c may be opposite to the second light emitting module 601b. The fourth light emitting module 601d defined by rotating the third light emitting module 601c by 90° clockwise may have an identical pitch structure to the second light emitting module 601b. As described above, the luminance non-uniformity that may be caused by the different between the pitches in the x and y-directions as the adjacent light emitting modules have different layer structures can be minimized. As a result, the planar light source 600 can reduce the number of the light emitting elements 602 while maintaining the uniformity of the luminance distribution.

In this case, the luminance deterioration caused by the reduction of the number of the light emitting elements 602 can be solved by increasing the current applied. As described above, if the layout structure of the first light emitting module 601a and the region occupied by the first light emitting module 601a are determined, the layout structures of the rest light emitting modules can be determined by rotating the first light emitting module 601a clockwise or counterclockwise and the luminance uniformity and the reduction of the number of the light emitting elements can be realized regardless of the rotational direction.

Figure 8:
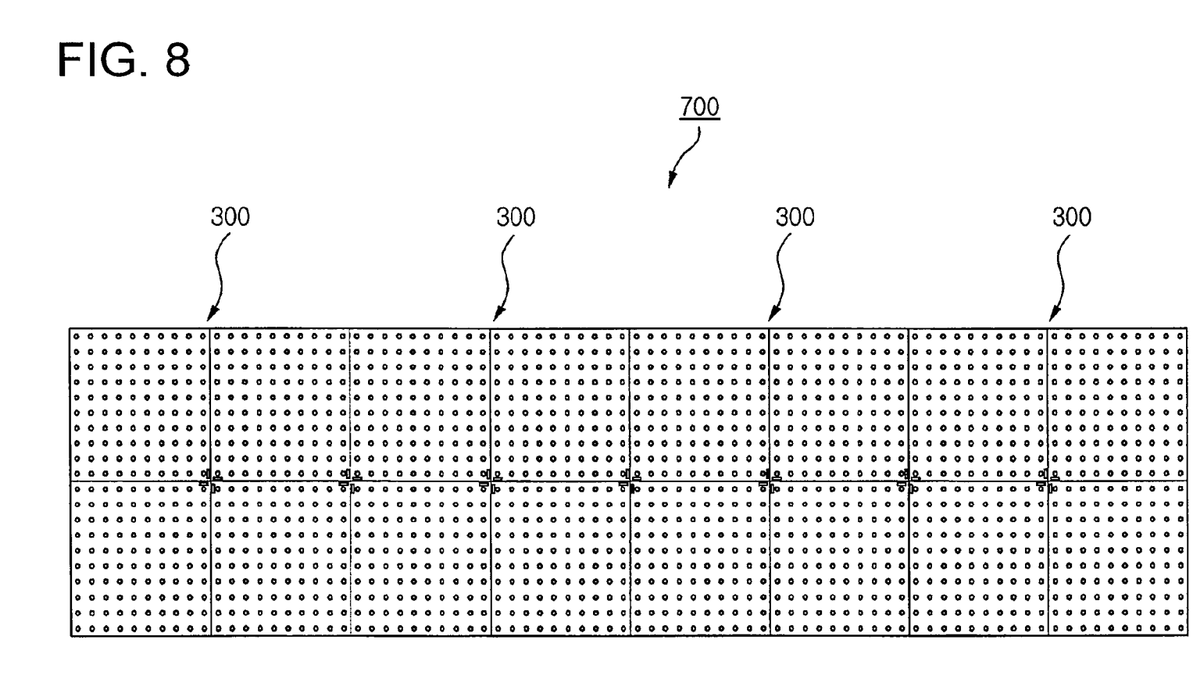
FIG. 8 is a top plane view of a planar light source according to another embodiment.

In the above embodiments, the cases where the overall shape of the planar light source is formed in the perfect square shape and the circular shape are illustrated. However, as shown in FIG. 8, the concept of the disclosure can be applied to a rectangular planar light source. FIG. 8 is a top plane view of a planar light source according to another embodiment. In this embodiment, a planar light source 700 is formed in a rectangular shape. That is, the planar light source 700 may include four planar light sources 300 each depicted in FIG. 3 and connected to each other side-by-side. That is, the planar light source provided by the present invention can be applied to sizes of 300*1200 and 600*1200 as well as 300*300 and 600*600.

Figure 9:
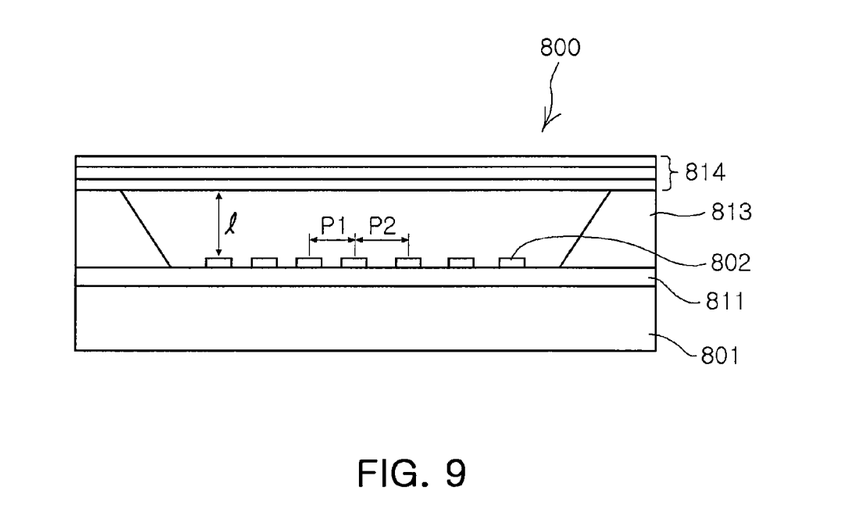
FIG. 9 is a cross-sectional view of a backlight unit according to an embodiment.

Furthermore, the planar light source structure as described above may be applied to a backlight unit for emitting light to a rear surface of a liquid crystal display (LCD) panel. FIG. 9 is a cross-sectional view of a backlight unit according to an embodiment.

Referring to FIG. 9, a backlight unit 800 of this embodiment may include a planar light source that is one of the planar light sources that are previously described. The planar light source includes a substrate 801 and a plurality of light emitting elements 802. The light emitting elements 802 are arranged with different pitches P1 and P2. In addition, although not shown in FIG. 9 in detail, the planar light source includes first to $n_{th}$ light emitting modules that are formed by dividing the light emitting region into n-number sections. The second to $n_{th}$ are formed by sequentially rotating the first light emitting module by 360°/n clockwise or counterclockwise. Furthermore, although not shown in FIG. 9, connectors for supply electric power to the light emitting elements 802 are disposed near the rotational center of the first to $n_{th}$ light emitting modules and thus the power wiring efficiency can be improved.

An optical sheet assembly 814 including a diffusing sheet or diffusing plate for uniformly diffusing incident light, a light collecting sheet disposed on the diffusing sheet or plate to collect the incident light, and the like is disposed on the planar light source. The optical sheet assembly 814 may further include a protecting sheet that is disposed on the light collecting sheet to protect the optical sheet assembly. A sidewall 813 is formed to enclose the light emitting elements 802 and have an inclined surface toward a direction in which the light emitting elements 802 are arranged. A reflective layer 811 for reflecting the light emitted from the light emitting elements 802 upward may be provided on the substrate 801. Meanwhile, the pitches P1 and P2 between the adjacent light emitting elements 802 may be less than an optical distance 1. When this condition is not satisfied, the luminance uniformity of the planar light source may be deteriorated and hot spots may be generated. Here, the optical distance 1 is a distance from a light emission surface of the light emitting elements 801 to the optical sheet assembly 814, i.e., a distance to which the light travels in a vertical direction.

While the present invention has been shown and described in connection with the exemplary embodiments, it will be apparent to those skilled in the art that modifications and variations can be made without departing from the spirit and scope of the invention as defined by the appended claims.

What is claimed is:

1. A planar light source comprising:
   first to $n_{th}$ light emitting modules, n is a natural number that is two or more than two, each having a plurality of light emitting elements and a connector that is electrically connected to the light emitting elements,
   wherein the connector of the first light emitting module is disposed near an angular point, which is a rotational central point, of a region defining the first light emitting module; and
   the light emitting elements and connector of the $i_{th}$ light emitting module has a layout structure defined by a clockwise or counter-clockwise rotation of the light emitting elements and connectors of the first light emitting module by an angle (i−1)/n×360° about the rotational central point, wherein i is a natural number which satisfies 2≦i≦n,
   wherein the connectors of the respective first to $n_{th}$ light emitting modules are disposed near the rotational central point, respectively, and supply electric power to the plurality of light emitting elements of the respective first to nth light emitting modules, and
   the connectors of the respective first to $n_{th}$ light emitting modules disposed near the rotational central point are separated from each other without being connected to each other through the respective connectors when the first to $n_{th}$ light emitting modules are connected to each other side-by-side to form the planar light source.

2. The planar light source of claim 1, wherein the first to $n_{th}$ light emitting modules are formed in an identical shape.

3. The planar light source of claim 1, wherein the light emitting elements and connector of the first light emitting module has a layout structure defined by a clockwise or counter-clockwise rotation of the light emitting elements and connector of the $n_{th}$ light emitting module by an angle of 1/n×360°.

4. The planar light source of claim 1, wherein the n is a natural number that is three or more than three, and a shape defined by the first to $n_{th}$ light emitting modules is a perfect polygonal shape having n angles.

5. The planar light source of claim 1, wherein a shape defined by the first to $n_{th}$ light emitting modules is a perfect square shape.

6. The planar light source of claim 1, wherein a shape defined by each the first to $n_{th}$ light emitting modules is an arch shape and a shape defined by all of the first to $n_{th}$ light emitting modules is a circular shape.

7. The planar light source of claim 1, wherein the plurality of the light emitting elements of the first to $n_{th}$ light emitting modules are two-dimensionally arranged in first and second directions that are different from each other.

8. The planar light source of claim 7, wherein at least some of the plurality of the light emitting elements that are two-dimensionally arranged have different pitches in the fist and second directions.

9. The planar light source of claim 7, wherein an angle defined between the first and second directions is 1/n×360°, wherein n is a number of the light emitting modules comprising the planar light source.

10. The planar light source of claim 9, wherein the first direction is in parallel with a boundary line between the first and second light emitting modules and the second direction is in parallel with a boundary line between the first light emitting module and the $n_{th}$ light emitting module.

11. The planar light source of claim 1, wherein the plurality of the light emitting elements and the connectors are disposed on an identical surface.

12. The planar light source of claim 1, wherein the plurality of the light emitting elements and the connectors are disposed on difference surfaces.

13. The planar light source of claim 12, wherein the plurality of the light emitting elements are disposed on an opposite surface to a surface where the connector are disposed.

14. A backlight unit comprising:
a substrate;
a planar light source comprising first to $n_{th}$ light emitting modules, n is a natural number that is two or more than two, that are disposed on an identical surface and each of which has a plurality of light emitting elements and a connector that is electrically connected to the light emitting elements, wherein the connector of the first light emitting module is disposed near an angular point, which is a rotational central point, of a region defining the first light emitting module and the light emitting elements and connector of the $i_{th}$ light emitting module has a layout structure defined by a clockwise or counter-clockwise rotation of the light emitting elements and connectors of the first light emitting module by an angle (i−1)/n×360° about the rotational central point, wherein i is a natural number which satisfies 2≦i≦n; and
a diffusing sheet assembly disposed above the planer light source and uniformly diffusing the light from the planar light source,
wherein the connectors of the respective first to $n_{th}$ light emitting modules are disposed near the rotational central point, respectively, which defines a central point of the planar light source, and
the connectors of the respective first $n_{th}$ light emitting modules disposed near the rotational central point are separated from each other when the first to $n_{th}$ light emitting modules are connected to each other side-by-side to form the planar light source, without being electrically connected to each other through the respective connectors.

15. The backlight unit of claim 14, wherein a distance from a top surface of the light emitting elements of the planar light source to the diffusing sheet assembly is greater than a distance between the adjacent light emitting elements.

16. The backlight unit of claim 14, further comprising a reflective layer that is disposed on the substrate to reflect light emitted from the light emitting elements.

* * * * *